2 Sheets—Sheet 1.
J. C. KOCH.
Picture-Exhibitor.
No. 200,460.     Patented Feb. 19, 1878.
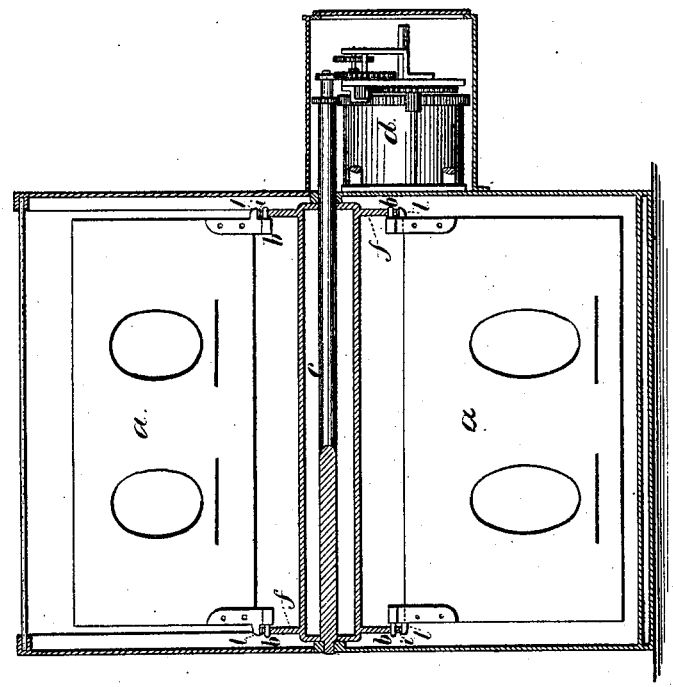
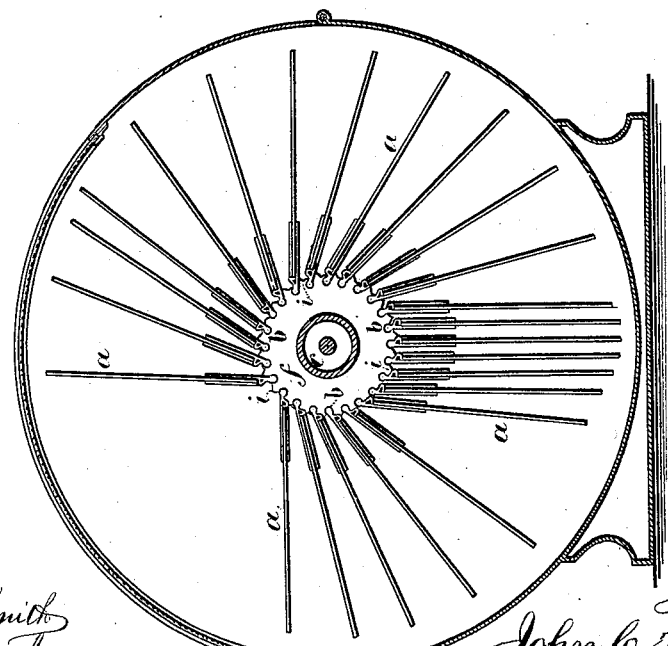
Witnesses
Chas. H. Smith
Geo. T. Pinckney
Inventor
John C. Koch.
Lemuel W. Serrell 2 Sheets—Sheet 2.

J. C. KOCH.
Picture-Exhibitor.

No. 200,460.     Patented Feb. 19, 1878.

Witnesses
Chas. H. Smith
Geo. T. Pinckney

Inventor
John C. Koch.

per Lemuel W. Serrell
Atty

N. PETERS, PHOTO-LITHOGRAPHER, WASHINGTON, D C

UNITED STATES PATENT OFFICE.

JOHN C. KOCH, OF NEW YORK, N. Y.

IMPROVEMENT IN PICTURE-EXHIBITORS.

Specification forming part of Letters Patent No. 200,460, dated February 19, 1878; application filed November 2, 1877.

*To all whom it may concern:*

Be it known that I, JOHN C. KOCH, of Brooklyn, in the county of Kings and State of New York, have invented an Improvement in Holders for Photographs and other Pictures, of which the following is a specification:

This apparatus is adapted to receive a number of pictures connected at one edge to a revolving holder, in such a manner that the ascending picture is brought above the revolving holder in an inclined position, and when the picture passes a vertical position it falls over into a downwardly-inclined position, and the picture upon the receding side can be examined. This improvement is especially intended for the display of cartes-de-visite or likenesses placed in holders or leaves, similar to those used in photograph-albums.

The holder is placed in a case, so as to exclude dust and keep the pictures clean, and the revolving holder is made so that it can be entirely or partially filled with pictures, and the leaves can be changed and others substituted without removing the pictures from the leaves, which is a great convenience over the ordinary photograph-albums.

Figure 3:
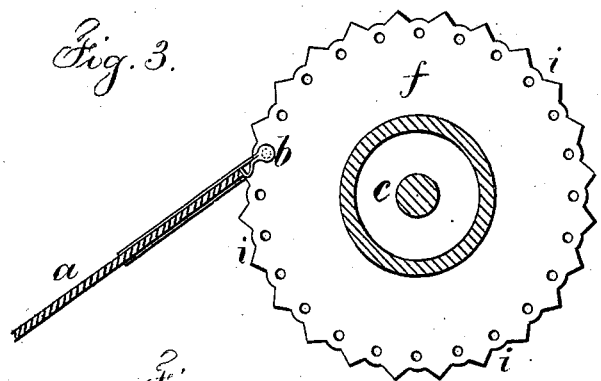
Figure 4:
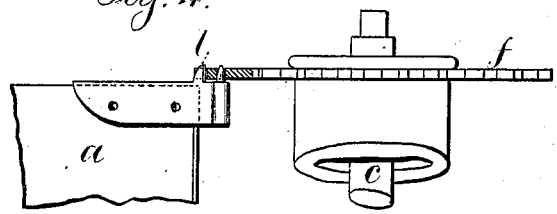
Figure 5:
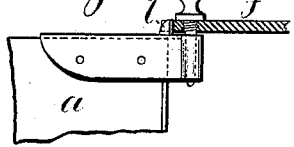
Figure 6:
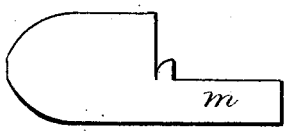
Figure 7:
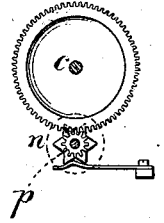

In the drawing, Figure 1 is a vertical section transversely of the pictures. Fig. 2 is an elevation, partially in section. Fig. 3 is an elevation of one of the holder-disks with one of the leaves in place. Fig. 4 is a sectional plan of the same. Fig. 5 represents the holder and screw for attaching the pictures. Fig. 6 represents the shape of the plate of metal made use of in forming the hinge for the photograph-leaf, and Fig. 7 represents the means for turning the holder by hand.

The photograph or other picture leaves or frames $a$ are made to receive the pictures like the leaves of an album, or in any other desired manner. At the angles on one side are the connecting-hinges $b\ b$.

The picture-holder is made of the shaft $c$, that is to be revolved by a spring and train of gearing at $d$; or it may be turned by hand.

The train of gearing may be similar to a clock-movement, and a music-box attachment may be added, if desired.

Upon this shaft $c$ there are disks or heads $f$, adapted to receive the hinges of the numerous leaves or frames $a$, that surround this shaft or holder.

It is preferable to make the heads $f$ with numerous holes parallel to the axis $c$, but passing through the heads near their outer edges, and the heads $f$ are provided with inclined stops $i$ between the respective hinge-holes, so that the heel-pieces $l$ of the hinges may rest upon such inclines as the picture is being carried up on one side in an inclined position, or lowered on the other side in a similar inclined position, as illustrated in Fig. 1, the frame or leaf being free to swing between these two points.

It is generally preferable to make both hinges of projecting pins to enter the holes in the heads, and to spring the leaf or frame into place by slightly bending it; but where the frame is rigid, the pin at one end may be provided with a screw shank and head, as seen in Fig. 5, to screw into the disk $f$, the parallel portion of the pin passing into the sheet-metal hinge, the space or eye for the same being formed by bending up the sheet-metal tongue $m$, Fig. 6, and passing the end beneath the sheet metal that clips the edge of the leaf or frame $a$.

It will now be evident that if the shaft of the holder is supported in a suitable frame or case, the pictures can be brought around in succession and examined, and that the front of the rising leaf and the back of the descending leaf will be visible, and that the pictures thereon can be examined.

The case that is made to contain this picture-holder can be of any suitable size or shape. It is generally preferable to employ a case with glass in the upper portions, so as to exclude dust and to allow the pictures to be examined.

When the picture-holder is to be turned by hand, a knob, $n$, (shown by dotted lines in Fig. 7,) is to be provided upon the projecting end of the shaft.

It is generally preferable to have a star-wheel, $p$, with the teeth resting against a spring, and the parts of the gearing proportioned so that one tooth or point of the star-wheel moves over the spring each time one of the pictures swings from one position to the next. This renders the movement of the holder more uniform.

I am aware that slats containing street or station names have been hinged to revolving heads; but the same were not adapted to holding photograph and other pictures; neither were the hinges made with stops to limit the movement.

I claim as my invention—

The heads $f$, made with holes and intermediate stops $i$, in combination with the hinges of sheet metal attached to the leaves $a$, and having heel-pieces $l$, substantially as set forth.

Signed by me this 30th day of October, A. D. 1877.

JOHN C. KOCH.

Witnesses:
  GEO. T. PINCKNEY,
  CHAS. H. SMITH.